(12) United States Patent
Okita et al.

(10) Patent No.: US 8,698,442 B2
(45) Date of Patent: Apr. 15, 2014

(54) MOTOR DRIVE CONTROL DEVICE FOR LIMITING OUTPUT OF MOTOR

(71) Applicant: FANUC Corporation, Yamanashi (JP)

(72) Inventors: Tadashi Okita, Yamanishi (JP); Daisuke Tajima, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 0 days.

(21) Appl. No.: 13/739,199

(22) Filed: Jan. 11, 2013

(65) Prior Publication Data

US 2013/0193900 A1    Aug. 1, 2013

(30) Foreign Application Priority Data

Jan. 31, 2012  (JP) ................. 2012-018839

(51) Int. Cl.
*H02P 5/74* (2006.01)
(52) U.S. Cl.
USPC ............................ 318/566; 318/575; 318/625
(58) Field of Classification Search
USPC .................. 318/560, 565, 566, 575, 625, 626
See application file for complete search history.

(56) References Cited

U.S. PATENT DOCUMENTS

| 4,499,414 | A | * | 2/1985 | Fujioka et al. ................ 318/803 |
| 5,113,123 | A | * | 5/1992 | Noser et al. .................... 318/106 |
| 5,814,956 | A | * | 9/1998 | Kono et al. .................... 318/380 |

FOREIGN PATENT DOCUMENTS

| JP | 2000-354396 A | 12/2000 |
| JP | 2002-199792 A | 7/2002 |
| JP | 2002-272153 A | 9/2002 |
| JP | 2002-291274 A | 10/2002 |
| JP | 2007-293532 A | 11/2007 |
| JP | 2010-142049 A | 6/2010 |
| WO | 2008093485 A1 | 8/2008 |

OTHER PUBLICATIONS

Japanese Office Action for corresponding Patent Application No. 2012-018839 drafted Mar. 5, 2013.

* cited by examiner

*Primary Examiner* — Bentsu Ro
(74) *Attorney, Agent, or Firm* — Lowe Hauptman & Ham, LLP (57) ABSTRACT

If it is predicted that the sum of the output of a servo motor and the output of a spindle motor exceeds power supplied by a rectifier unit, during a cutting operation, a motor drive control device controls alternating-current power of a first inverter unit so as to reduce the feed speed of at least one feed axis and controls alternating-current power of a second inverter unit so as not to limit torque of the spindle motor. Further, if it is predicted that the sum of the output of the servo motor and the output of the spindle motor exceeds power supplied by the rectifier unit, during an operation other than the cutting operation, the motor drive control device controls the alternating-current power of the second inverter unit so as to limit the torque so as not to reduce the feed speed.

3 Claims, 5 Drawing Sheets

MOTOR DRIVE CONTROL DEVICE FOR LIMITING OUTPUT OF MOTOR

RELATED APPLICATIONS

The present application is based on, and claims priority from, Japanese Application Number 2012-018839, filed Jan. 31, 2012, the disclosure of which is hereby incorporated by reference herein in its entirety.

BACKGROUND OF THE INVENTION

1. Field of the Invention

The present invention relates to a motor drive control device for driving and controlling at least one servo motor configured to drive one feed axis to move a table or tool of a machine tool and one spindle motor having one main axis to rotate a table or tool of a machine tool.

2. Description of Related Art

In such a motor drive control device, in order to drive and control a servo motor and a spindle motor, alternating-current voltage or alternating current from a commercial alternating-current power source, such as a three-phase alternating-current power source, is converted into direct-current voltage or direct current and then, converted into alternating-current voltage or alternating current of an arbitrary frequency and the converted alternating-current voltage or alternating current is supplied to the servo motor and the spindle motor, respectively. To do this, the motor drive control device has: a first inverter unit to which one rectifier unit configured to convert alternating-current voltage or alternating current into direct-current voltage or direct current is connected, and which is configured to convert the direct-current voltage or direct current supplied from the rectifier unit into alternating-current voltage or alternating current and to supply the converted alternating-current voltage or alternating current to the servo motor; and a second inverter unit to which the rectifier unit is connected and which is configured to convert the direct-current voltage or direct current supplied from the rectifier unit into alternating-current voltage or alternating current and to supply the converted alternating-current voltage or alternating current to the spindle motor.

If the electric power, which can be supplied by the rectifier unit, larger than the sum of the maximum output of the servo motor and the maximum output of the spindle motor is set, there is no possibility of the output of the servo motor and the output of the spindle motor running short. However, it is rare that the servo motor and the spindle motor reach the maximum output at the same time, and therefore, the electric power, which can be supplied by the rectifier unit, is usually set to an output supposed to be smaller than the sum of the maximum output of the servo motor and the maximum output of the spindle motor from the viewpoint of the installation space and cost of the rectifier unit.

On the other hand, in the case where the sum of the output of the servo motor and the output of the spindle motor exceeds the electric power, which can be supplied by the rectifier unit, because of a high load caused during a machining operation, such as a cutting operation of a workpiece by a machine tool, etc., an alarm is issued and the machining operation is stopped by emergency-stopping the rectifier unit.

In particular, if an instantaneous input power drop etc., occurs, the electric power, which can be supplied from the rectifier unit, is reduced, however, in order to prevent the machining operation from being stopped even in such a case, a motor drive control device that limits the torque of a motor so that the sum of the outputs of the motors does not exceed the electric power, which can be supplied by the rectifier unit, is proposed in, for example, Japanese Unexamined Patent Publication (Kokai) No. 2002-354396 (JP2002-354396A) and WO2008-093485 (JP2008-093485A1)

If the torque of the servo motor is limited in order to limit the sum of the output of the servo motor and the output of the spindle motor, the ratio of the output of the servo motor to the sum of the output of the servo motor and the output of the spindle motor is remarkably small (for example, 10%), and therefore, it is difficult to effectively limit the sum of the output of the servo motor and the output of the spindle motor.

Further, if the torque of the servo motor is limited in order to limit the sum of the output of the servo motor and the output of the spindle motor, there may be a case where the cutting operation of a workpiece by the machine tool is adversely affected because of deterioration of tracking of the position command to the servo motor.

On the other hand, if the torque of the spindle motor is limited in order to limit the sum of the output of the servo motor and the output of the spindle motor, there may be a case where the cutting operation of a workpiece by the machine tool is affected adversely when it is no longer possible to continue the cutting operation because of the stop of the spindle motor due to the shortage of torque during the cutting operation of a workpiece by the machine tool, in particular, during the cutting operation of a heavy workpiece.

SUMMARY OF THE INVENTION

As an aspect, the present invention provides a motor drive control device capable of limiting the output of a motor without adversely affecting the cutting operation of a workpiece by a machine tool.

According to an aspect of the present invention, the motor drive control device for driving and controlling at least one servo motor configured to drive one feed axis to move a table or tool of a machine tool and a spindle motor having one main axis to rotate a table or tool of a machine tool, includes: a first inverter unit configured to convert a direct-current voltage or direct current supplied from a rectifier unit into an alternating-current voltage or alternating current and to supply the converted alternating-current voltage or alternating current to a servo motor; a second inverter unit configured to convert a direct-current voltage or direct current supplied from a rectifier unit into an alternating-current voltage or alternating current and to supply the converted alternating-current voltage or alternating current to the spindle motor; a first control unit configured to control the alternating-current power of the first inverter unit so as to reduce the feed speed of at least one feed axis of the machine tool if it is predicted that the sum of the output of the servo motor and the output of the spindle motor exceeds the electric power, which can be supplied by the rectifier unit, during the cutting operation of a workpiece by the machine tool and to control the alternating-current power of the first inverter unit so as not to reduce the feed speed if it is predicted that the sum of the output of the servo motor and the output of the spindle motor exceeds the electric power, which can be supplied by the rectifier unit, during an operation other than the cutting operation of a workpiece by the machine tool; and a second control unit configured to control the alternating-current power of the second inverter unit so as not to limit the torque of the spindle motor if it is predicted that the sum of the output of the servo motor and the output of the spindle motor exceeds the electric power, which can be supplied by the rectifier unit, during the cutting operation of a workpiece by the machine tool and to control the alternating-current power of the second inverter unit so as to limit the torque of the spindle motor if it is predicted that the sum of the output of the servo motor and the output of the spindle motor exceeds the electric power, which can be supplied by the rectifier unit, during an operation other than the cutting operation of a workpiece by the machine tool.

Preferably, the first control unit or the second control unit monitors a DC link voltage between the rectifier unit and the first inverter unit or between the rectifier unit and the second inverter unit and provides information about the DC link voltage to an upper control device, and the first control unit controls the alternating-current power of the first inverter unit so as to reduce the feed speed of at least one feed axis of the machine tool in response to a feed speed reduction command issued from the upper control device if the upper control device predicts that the sum of the output of the servo motor and the output of the spindle motor exceeds the electric power, which can be supplied by the rectifier unit, during the cutting operation, based on the DC link voltage.

Preferably, the first control unit or the second control unit monitors the DC link voltage between the rectifier unit and the first inverter unit or between the rectifier unit and the second inverter unit and provides information about the DC link voltage to the upper control device, and the second control unit controls the alternating-current power of the second inverter unit so as to limit the torque of the spindle motor in response to a torque limitation command issued from the upper control device if the upper control device predicts that the sum of the output of the servo motor and the output of the spindle motor exceeds the electric power, which can be supplied by the rectifier unit, during an operation other than the cutting operation, based on the DC link voltage.

Preferably, the second control unit predicts whether or not the sum of the output of the servo motor and the output of the spindle motor exceeds the electric power, which can be supplied by the rectifier unit, by monitoring the DC link voltage between the rectifier unit and the second inverter unit, and controls the alternating-current power of the second inverter unit so as to limit the torque of the spindle motor if the second control unit predicts that the sum of the output of the servo motor and the output of the spindle motor exceeds the electric power, which can be supplied by the rectifier unit, during an operation other than the cutting operation.

According to an aspect of the present invention, if it is predicted that the sum of the output of the servo motor and the output of the spindle motor exceeds the electric power, which can be supplied by the rectifier unit, during the cutting operation of a workpiece by the machine tool, the alternating-current power of the first inverter unit is controlled so at to reduce the feed speed of at least one feed axis of the machine tool and at the same time, the alternating-current power of the second inverter unit is controlled so as not to limit the torque of the spindle motor. Further, if it is predicted that the sum of the output of the servo motor and the output of the spindle motor exceeds the electric power, which can be supplied by the rectifier unit, during an operation other than the cutting operation of a workpiece by the machine tool, the alternating-current power of the second inverter unit is controlled so as to limit the torque of the spindle motor so as not to reduce the feed speed. By reducing the feed speed of the feed axis during the cutting operation of a workpiece by the machine tool as described above, the output required by the spindle motor is reduced as a result. Thereby, the output of the spindle motor remarkably larger than the output of the servo motor reduces sufficiently and it is possible to effectively limit the sum of the output of the servo motor and the output of the spindle motor, and therefore, it is possible to limit the output of the motor without adversely affecting the cutting operation of a workpiece by the machine tool.

BRIEF DESCRIPTION OF THE DRAWINGS

The objects, features, and advantages of the present invention will be clear by the description of the following embodiments relating to the accompanying drawings. In the drawings.

DETAILED DESCRIPTION

Embodiments of the motor drive control device according to the present invention are explained with reference to the drawings. In the drawings, the same symbol is attached to the same component.

Figure 1:
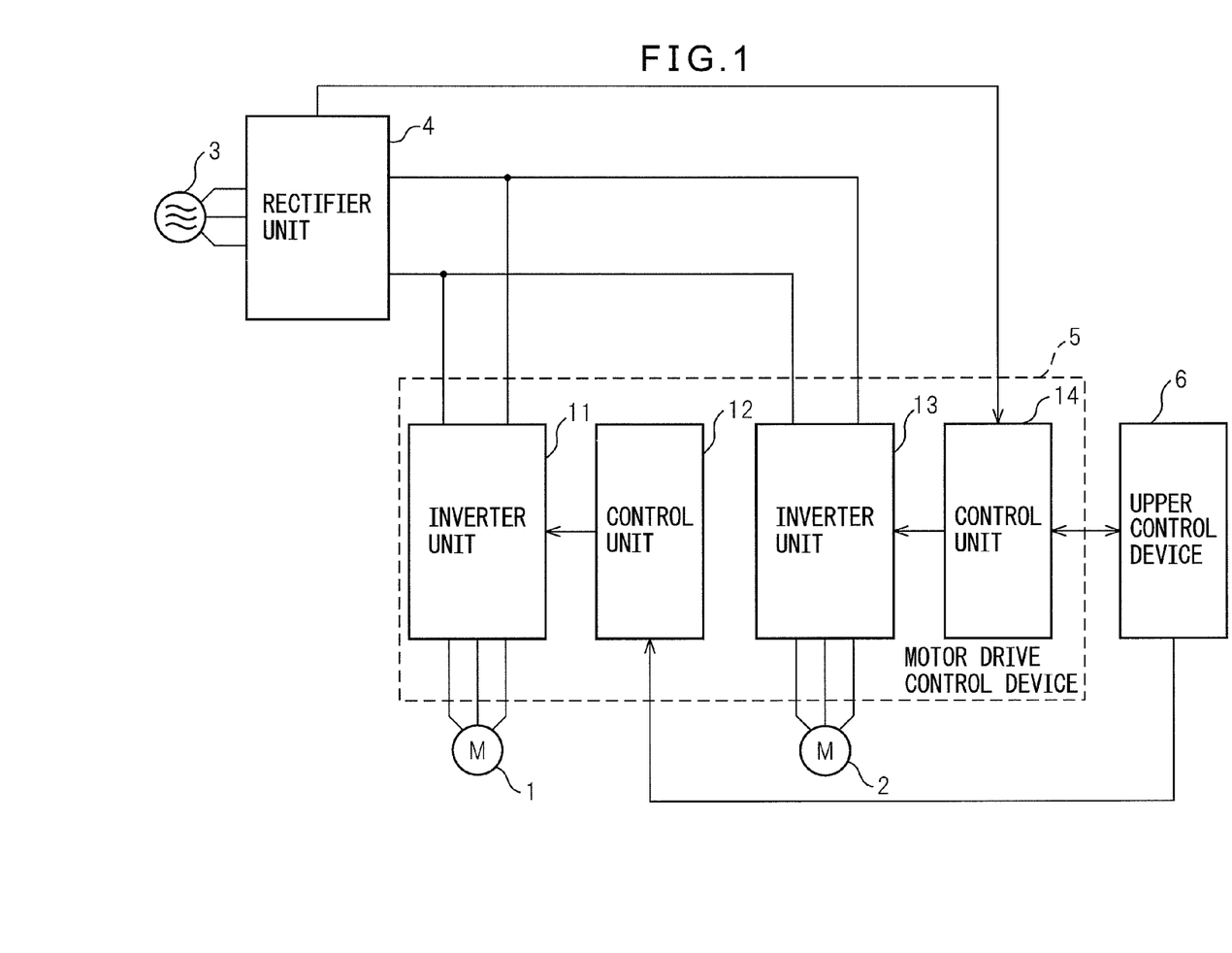
FIG. 1 is a block diagram of a system having a motor drive control device according to a first embodiment of the present invention.

Referring to the drawings, FIG. 1 is a block diagram of a system having a motor drive control device according to a first embodiment of the present invention. The system shown in FIG. 1 is used to drive and control at least one servo motor 1 configured to drive one feed axis to move a table or tool of a machine tool and a spindle motor 2 having a fist main axis to rotate a table or tool of a machine tool. To do this, the system shown in FIG. 1 has a three-phase alternating-current power source 3, a rectifier unit 4, a motor drive control device 5, and an upper control device 6. In FIG. 1, one servo motor 1 is shown, however, it may also be possible to provide two or more servo motors 1 and to drive at least two feed axes perpendicular to each other to move the table or tool of the machine tool.

The three-phase alternating-current power source 3 is configured by a commercial alternating-current power source. The rectifier unit 4 converts an Alternating-current voltage of alternating current supplied from the three-phase alternating-current power source 3 into a direct-current voltage or direct current. To do this, the rectifier unit 4 has, for example, six diodes bridge-connected to one another and a smoothing capacitor.

The motor drive control device 5 has an inverter unit 11 as a first inverter unit, a control unit 12 as a first control unit, an inverter unit 13 as a second inverter unit, and a control unit 14 as a second control unit.

The inverter unit 11 converts a direct-current voltage or direct current supplied from the rectifier unit 4 into an alternating-current voltage or alternating current and supplies the converted alternating-current voltage or alternating current to the servo motor 1. To do this, the inverter unit 11 has, for example, six diodes bridge-connected to one another and switching elements (for example, NPN transistor) connected in parallel to the diodes, respectively.

Various commands, such as a position command or speed command and a feed speed reduction command to reduce the feed speed of the feed axis driven by the servo motor 1, from the upper control device 6, are input to the control unit 12, through a communication path, such as a bus. Then, the control unit 12 generates a torque command based on the position command or the speed command, generates a PWM signal based on the generated torque command, inputs the PWM signal to the inverter unit 11 to control the turning on and off of the switching element of the inverter unit 11, and thus controls the alternating-current power of the inverter unit 11. To do this, the control unit 12 is implemented by a processor including an input/output port, a serial communication circuit, etc., and controls the inverter unit 11 in accordance with processing programs stored in a memory not shown schematically.

In the present embodiment, if the feed speed reduction command from the upper control device 6 is input to the control unit 12 in addition to the position command or speed command, the control unit 12 generates a torque command that has taken into consideration the feed speed reduction command in addition to the position command or speed command in order to control the alternating-current power of the inverter unit 11 so as to reduce the feed speed of the feed axis driven by the servo motor 1. Further, information with an operation determination flag, which is used to determine whether the cutting operation of a workpiece by the machine tool or an operation (for example, the acceleration or deceleration operation of the table or tool of the machine tool with no cutting operation accompanied) other than the cutting operation of a workpiece by the machine tool is carried out, from the upper control device 6 is supplied to the control unit 12, and then, the control unit 12 determines the operation state of the machine tool based on the operation determination flag.

The inverter unit 13 converts the direct-current voltage or direct current supplied from the rectifier unit 4 into an alternating-current voltage or alternating current and supplies the converted Alternating-current voltage or alternating current to the spindle motor 2. To do this, the inverter unit 13 has six diodes bridge-connected to one another and switching elements (for example, NPN transistor) connected to the diodes in parallel, respectively.

Various commands, such as the position command or speed command and the torque reduction command to limit the torque of the spindle motor 2, from the upper control device 6 are input to the control unit 14 through a communication path, such as a bus. Then, the control unit 14 generates a torque command based on the position command or speed command, generates a PWM signal based on the generated torque command, input the PWM signal to the inverter unit 13 to control the turning on and off of the switching element of the inverter unit 13, and thus controls the alternating-current power of the inverter unit 13. To do this, the control unit 14 is implemented by a processor including an input/output port, a serial communication circuit, etc., and controls the inverter unit 13 in accordance with processing programs stored in a memory not shown schematically.

In the present embodiment, if a torque limitation command from the upper control device 6 is input to the control unit 14 in addition to the position command or speed command, the control unit 14 generates a torque command that has taken into consideration the torque limitation command in addition to the position command or speed command in order to control the alternating-current power of the inverter unit 13 so as to limit the torque of the spindle motor 2. Further, information with an operation determination flag, which is used to determine whether the cutting operation of a workpiece by the machine tool or an operation other than the cutting operation of a workpiece by the machine tool is carried out, from the upper control device 6 is supplied to the control unit 14 and then, the control unit 14 determines the operation state of the machine tool based on the operation determination flag.

Furthermore, the control unit 14 monitors the DC link voltage input from the rectifier unit 4 and provides information of the DC link voltage value as information about the DC link voltage to the upper control device 6.

The upper control device 6 is configured by a CNC (computer numerical control) etc., and inputs the position command or speed command to the control units 12 and 14 and provides information with an operation determination flag to the control units 12 and 14 in order to carry out the cutting operation of a workpiece by the machine tool or an operation other than the cutting operation.

In the present embodiment, the upper control device 6 receives information of the DC link voltage value from the control unit 14, and determines whether or not the DC link voltage value is higher than the threshold value. If the DC link voltage value is less than a threshold value, the upper control device 6 predicts that the sum of the output of the servo motor 1 and the output of the spindle motor 2 exceeds the electric power, which can be supplied by the rectifier unit 4. In contrast to this, if the DC link voltage value is higher than the threshold value, the upper control device 6 predicts that the sum of the output of the servo motor 1 and the output of the spindle motor 2 does not exceed the electric power, which can be supplied by the rectifier unit 4. It is also possible for the control unit 14, in place of the upper control device 6, to determine whether or not the DC link voltage value is higher than the threshold value, will be described later.

Figure 2:
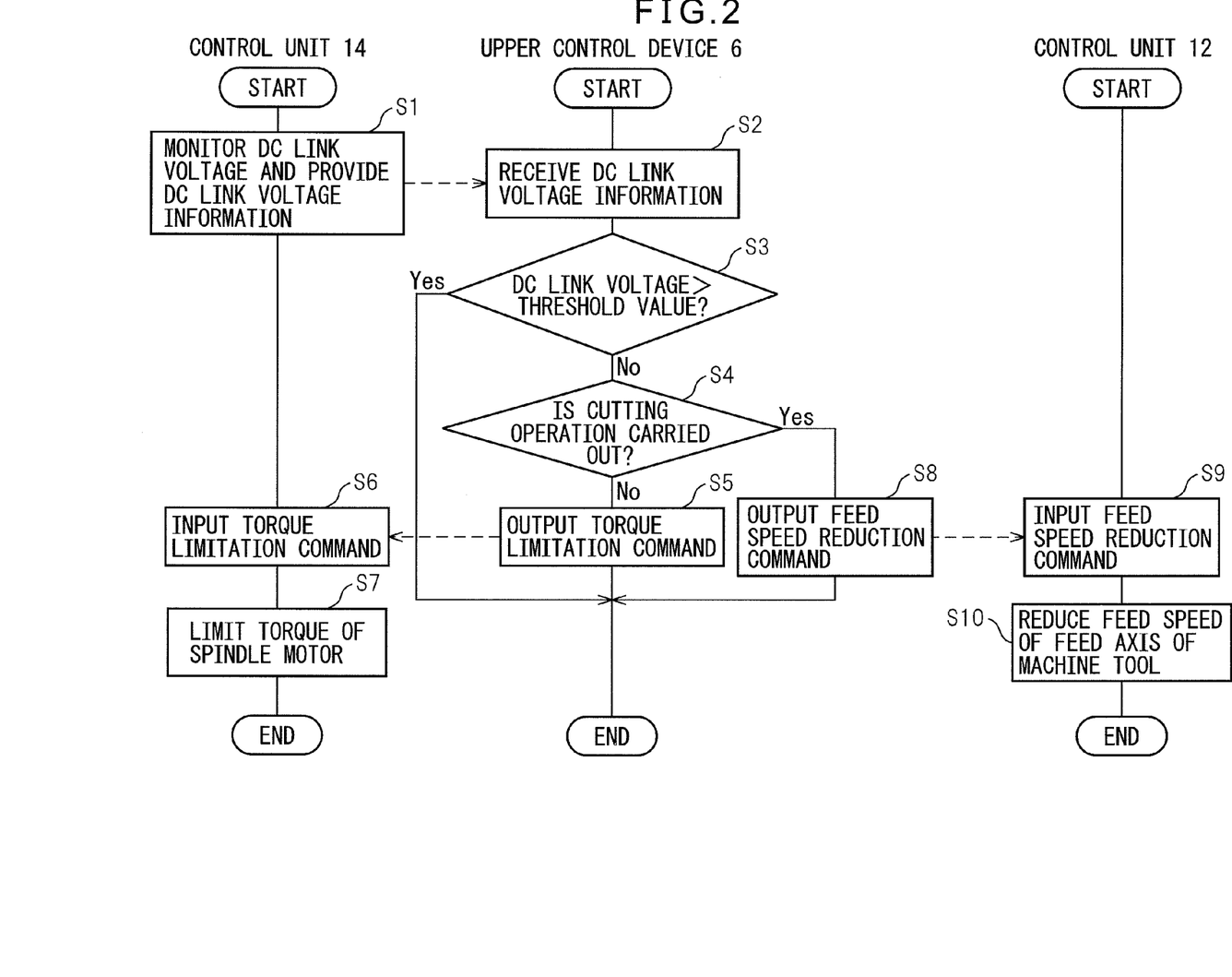
FIG. 2 is a flowchart of a first motor output limiting operation of the motor drive control device of FIG. 1.

FIG. 2 is a flowchart of a first motor output limiting operation in the first embodiment of the motor drive control device according to the present invention. This flowchart is carried out during the operation of the machine tool, in the upper control device 6, the flowchart is controlled by processing programs in which the upper control device 6 executes, in the control unit 12, the flowchart is controlled by processing programs in which the control unit 12 executes, and in the control unit 14, the flowchart is controlled by programs in which the control unit 14 executes.

First, the control unit 14 monitors the DC link voltage and provides information of the DC link voltage value to the upper control device 6 (step S1) and the upper control device 6 receives the information of the DC link voltage value from the control unit 14 (step S2).

Then, the upper control device 6 determines whether or not the DC link voltage value is higher than a threshold value (step S3). If the DC link voltage value is higher than the threshold value, the upper control device 6 predicts that the sum of the output of the servo motor 1 and the output of the spindle motor 2 does not exceed the electric power, which can be supplied by the rectifier unit 4, and exits the processing flow. In contrast to this, if the DC link voltage value is less than the threshold value, the upper control device 6 predicts that the sum of the output of the servo motor 1 and the output of the spindle motor 2 exceeds the electric power, which can be supplied by the rectifier unit 4, and then determines whether or not the cutting operation of a workpiece by the machine tool is carried out (step S4).

If the cutting operation is not carried out, the upper control device 6 outputs a torque limitation command for the spindle motor 2 to the control unit 14 (step S5), the torque limitation command for the spindle motor 2 from the upper control device 6 is input to the control unit 14 (step S6), and the control unit 14 controls the alternating-current power of the inverter unit 13 so as to limit the torque of the spindle motor 2 (step S7) and exits the processing flow. If the control unit 14 controls the alternating-current power of the inverter unit 13 so as to limit the torque of the spindle motor 2, the feed speed reduction command is not input to the control unit 12, and therefore, the alternating-current power of the inverter unit 13 is controlled by limiting the torque of the spindle motor 2 without reducing the feed speed.

On the other hand, if it is determined that the cutting operation is carried out in step S4, the upper control device 6 outputs the feed speed reduction command to the control unit 12 (step S8), the feed speed reduction command from the upper control device 6 is input to the control unit 12 (step S9), and the control unit 12 controls the alternating-current power of the inverter unit 11 so as to reduce the feed speed of the feed axis driven by the servo motor 1 (step S10) and exits the processing flow. If the control unit 12 controls the alternating-current power of the inverter unit 11 so as to reduce the feed speed of the feed axis to be driven, the torque limitation command is not input to the control unit 14, and therefore, the alternating-current power of the inverter unit 13 is controlled by reducing the feed speed of the feed axis without limiting the torque of the spindle motor 2.

According to the present embodiment, if it is predicted that the sum of the output of the servo motor 1 and the output of the spindle motor 2 exceeds the electric power, which can be supplied by the rectifier unit 4, during the cutting operation of a workpiece by the machine tool, the alternating-current power of the inverter unit 11 is controlled so as to reduce the feed speed of the feed axis driven by the servo motor 1 and at the same time, the alternating-current power of the inverter unit 13 is controlled so as not to limit the torque of the spindle motor 2. By reducing the feed speed of the feed axis during the cutting operation of a workpiece by the machine tool as described above, the output required by the spindle motor 2 is reduced as a result. Due to this, the output of the spindle motor 2, which is remarkably larger than the output of the servo motor 1, is reduced sufficiently and it is possible to effectively limit the sum of the output of the servo motor 1 and the output of the spindle motor 2, and therefore, it is possible to limit the sum of the output of the servo motor 1 and the output of the spindle motor 2 without adversely affecting the cutting operation of a workpiece by the machine tool.

Further, if it is predicted that the sum of the output of the servo motor 1 and the output of the spindle motor 2 exceeds the electric power, which can be supplied by the rectifier unit 4 during an operation other than the cutting operation of a workpiece by the machine tool, the alternating-current power of the inverter unit 13 is controlled so as to limit the torque of the spindle motor 2 without reducing the feed speed. By limiting the torque of the spindle motor 2 as described above, it is possible to effectively limit the sum of the output of the servo motor 1 and the output of the spindle motor 2 also during an operation other than the cutting operation of a workpiece by the machine tool. As described above, it is possible to effectively limit the sum of the output of the servo motor 1 and the output of the spindle motor 2 not only during the cutting operation of a workpiece by the machine tool but also during an operation other than the cutting operation of a workpiece by the machine tool, and therefore, it is possible to set the electric power, which can be supplied by the rectifier unit 4, to a maximum output smaller than the sum of the maximum output of the servo motor 1 and the maximum output of the spindle motor 2 and as a result thereof, it is possible to reduce the installation space of the rectifier unit 4 and to reduce the purchase cost of the rectifier unit 4.

Further, the determination whether or not the DC link voltage value is higher than the threshold value and the determination whether or not the cutting operation of a workpiece by the machine tool is carried out are carried out by the upper control device 6, and therefore, it is possible to simplify the configuration of the control units 12 and 14 compared to the case where these determinations are carried out by the control units 12 and 14.

Furthermore, the present embodiment does not require the communication means for knowing the state of the rectifier unit 4, and therefore, it is possible to simplify the configuration of the entire system compared to the case where the system has the communication means for the rectifier unit 4.

Figure 3:
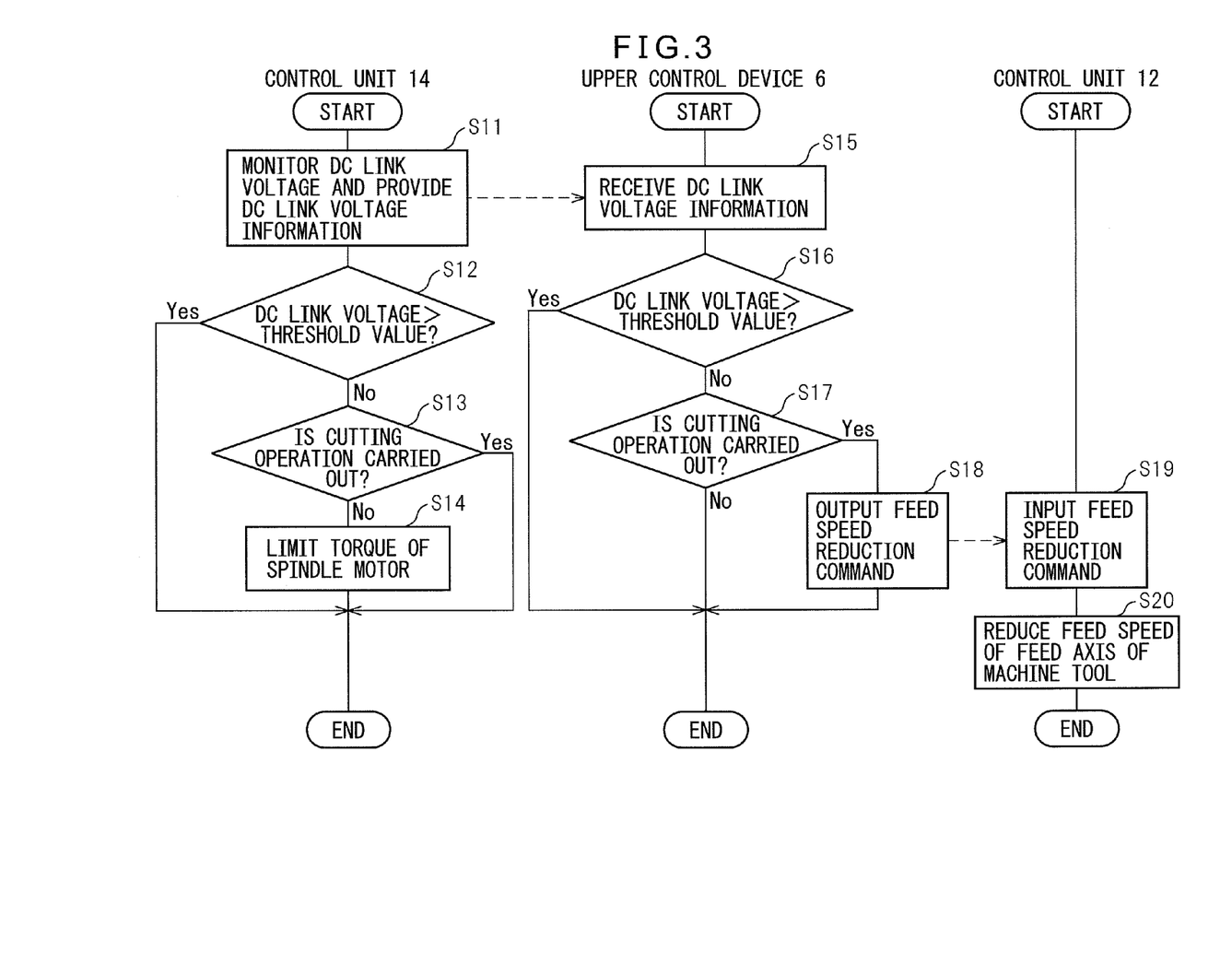
FIG. 3 is a flowchart of a second motor output limiting operation of the motor drive control device of FIG. 1.

FIG. 3 is a flowchart of a second motor output limiting operation in the first embodiment of the motor drive control device according to the present invention. This flowchart is carried out during the operation of the machine tool, in the upper control device 6, the flowchart is controlled by processing programs in which the upper control device 6 executes, in the control unit 12, the flowchart is controlled by processing programs in which the control unit 12 executes, and in the control unit 14, the flowchart is controlled by programs in which the control unit 14 executes.

First, the control unit 14 monitors the DC link voltage, provides information of the DC link voltage value to the upper control device 6 (step S11), and determines whether or not the DC link voltage value is higher than a threshold value (step S12). If the DC link voltage value is higher than the threshold value, the control unit 14 predicts that the sum of the output of the servo motor 1 and the output of the spindle motor 2 does not exceed the electric power, which can be supplied by the rectifier unit 4, and exits the processing flow. In contrast, if the DC link voltage value is less than the threshold value, the control unit 14 predicts that the sum of the output of the servo motor 1 and the output of the spindle motor 2 exceeds the electric power, which can be supplied by the rectifier unit 4, and then determines whether or not the cutting operation of a workpiece by the machine tool is carried out, based on the operation determination flag (step S13).

If the cutting operation is not carried out, the control unit 14 controls the alternating-current power of the inverter unit 13 so as to limit the torque of the spindle motor 2 (step S14) and exits the processing flow.

On the other hand, when the upper control device 6 receives information of the DC link voltage value from the control unit 14 (step S15), the upper control device 6 determines whether or not the DC link voltage value is higher than the threshold value (step S16). If the DC link voltage value is higher than the threshold value, the upper control device 6 predicts that the sum of the output of the servo motor 1 and the output of the spindle motor 2 does not exceed the electric power, which can be supplied by the rectifier unit 4, and exits the processing flow. In contrast to that, if the DC link voltage value is less than the threshold value, the upper control device 6 predicts that the sum of the output of the servo motor 1 and the output of the spindle motor 2 exceeds the electric power, which can be supplied by the rectifier unit 4, and then determines whether or not the cutting operation of a workpiece by the machine tool is carried out (step S17). If the control unit 14 controls the alternating-current power of the inverter unit 13 so as to limit the torque of the spindle motor 2, the speed reduction command is not input to the control unit 12, and therefore, the alternating-current power of the inverter unit 13 is controlled by limiting the torque of the spindle motor 2 without reducing the feed speed.

If the cutting operation is carried out, the upper control device 6 outputs the feed speed reduction command to the control unit 12 (step S18), the feed speed reduction command from the upper control device 6 is input to the control unit 12 (step S19), and the control unit 12 controls the alternating-current power of the inverter unit 11 so as to reduce the feed speed of the feed axis driven by the servo motor 1 (step S20) and exits the processing flow. If the control unit 12 controls the alternating-current power of the inverter unit 11 so as to reduce the feed speed of the feed axis to be driven, the torque limitation command is not input to the control unit 14, and therefore, the alternating-current power of the inverter unit 13 is controlled by reducing the feed speed without limiting the torque of the spindle motor 2.

According to the present embodiment, the determination whether or not the DC link voltage value is higher than the threshold value and the determination whether or not the cutting operation of a workpiece by the machine tool is carried out are carried out by the control unit 14, and therefore, it is possible for the control unit 14 to limit the torque more quickly compared to the case where these determinations are carried out by the upper control device 6.

Figure 4:
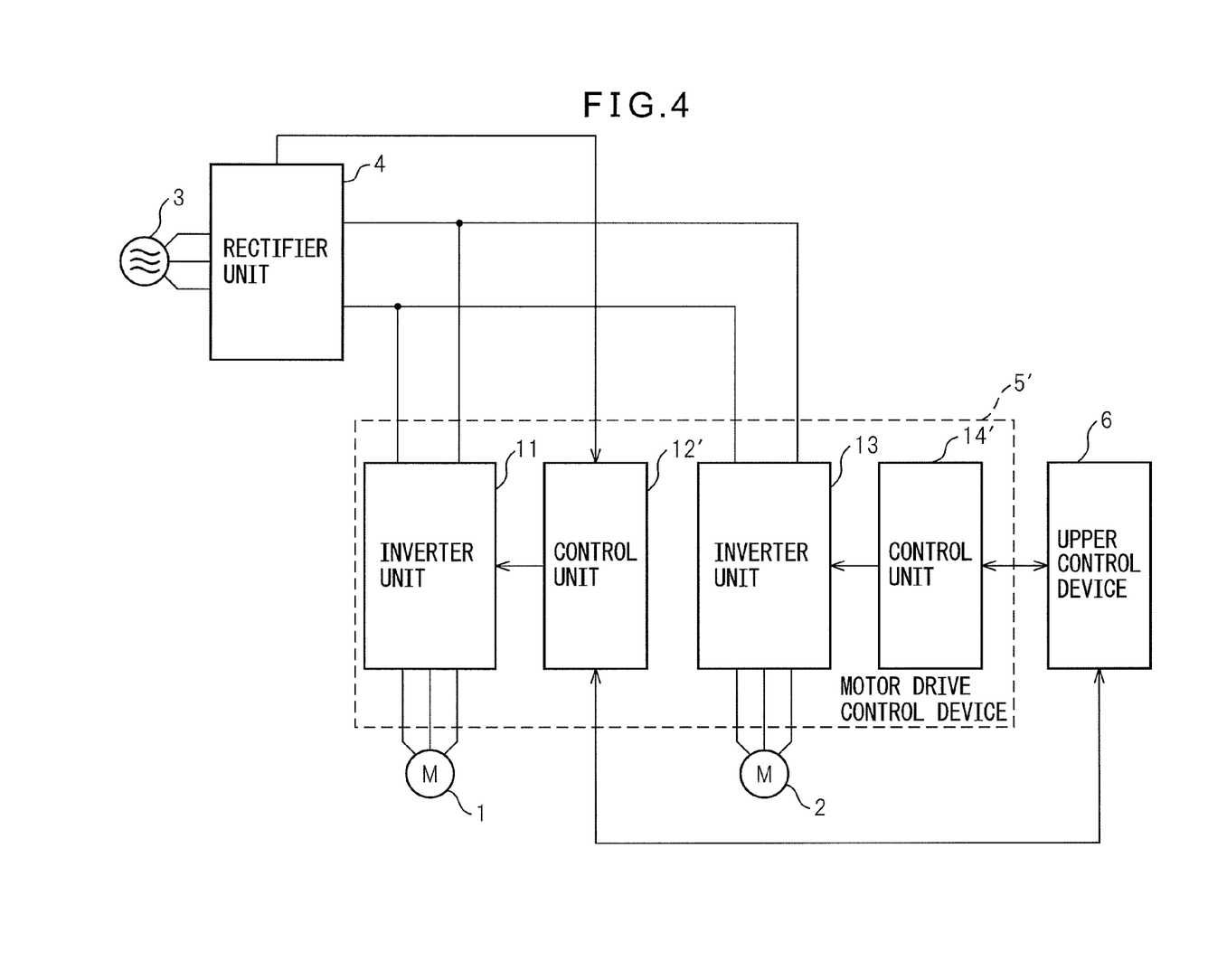
FIG. 4 is a block diagram of a system having a motor drive control device according to a second embodiment of the present invention.

FIG. 4 is a block diagram of a system having a motor drive control device according to a second embodiment of the present invention. The system shown in FIG. 4 is used to drive and control at least one servo motor 1 configured to drive one feed axis to move a table or tool of a machine tool and the spindle motor 2 having one main axis to rotate the table or tool of the machine tool. To do this, the system shown in FIG. 4 has the three-phase alternating-current power source 3, the rectifier unit 4, a motor drive control device 5', and the upper control device 6. In FIG. 4 also, one servo motor 1 is shown, however, it may also be possible to provide two or more servo motors 1 and to drive at least two feed axes perpendicular to each other to move the table or tool of the machine tool.

In FIG. 4, the three-phase alternating-current power source 3, the rectifier unit 4, and the upper control device 6 have the same configurations as those of the three-phase alternating-current power source 3, the rectifier unit 4, and the upper control device 6 of the first embodiment shown in FIG. 1, and therefore, explanation thereof is omitted.

The motor drive control device 5' has the inverter unit 11, a control unit 12' as a first control unit, the inverter unit 13, and a control unit 14' as a second control unit. In FIG. 4, the inverter units 11 and 13 have the same configurations as those of the inverter units 11 and 13 of the first embodiment shown in FIG. 1, and therefore, explanation thereof is omitted.

In a similar fashion to the control unit 12 of FIG. 1, the control unit 12' is implemented by a processor including an input/output port, a serial communication circuit, etc., and controls the alternating-current power of the inverter unit 11 in accordance with processing programs stored in a memory not shown schematically. Further, the control unit 12' carries out the same operation as the operation of the control unit 12 of FIG. 1 except that the control unit 12' monitors the DC link voltage and provides information of the DC link voltage value as information about the DC link voltage to the upper control device 6.

In a similar fashion to the control unit 14 of FIG. 1, the control unit 14' is implemented by a processor including an input/output port, a serial communication circuit, etc., and controls the alternating-current power of the inverter unit 13 in accordance with processing programs stored in a memory not shown schematically. Further, the control unit 14' carries out the same operation as the operation of the control unit 14 of FIG. 1, except that the control unit 14' does not monitor the DC link voltage or provide information of the DC link voltage value to the upper control device 6.

Figure 5:
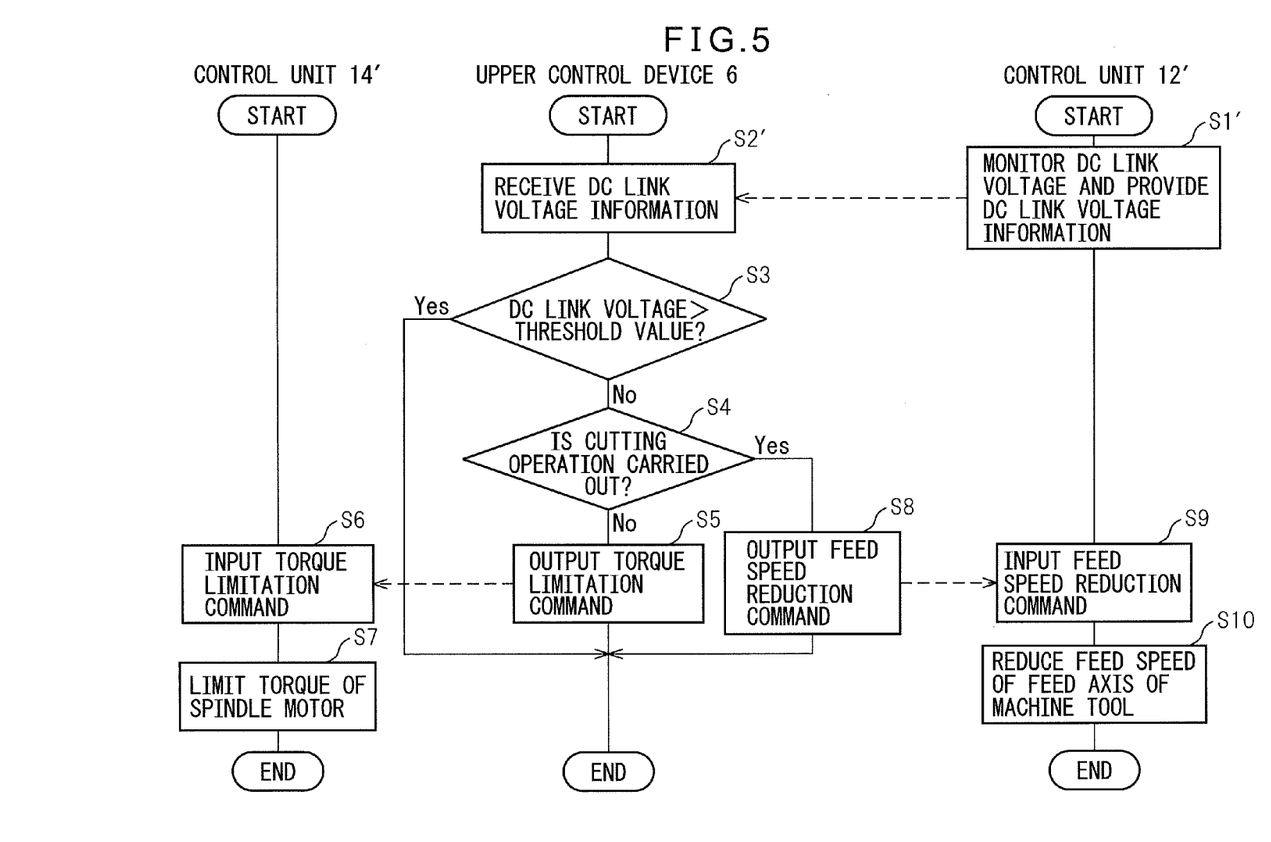
FIG. 5 is a flowchart of a motor output limiting operation of the motor drive control device of FIG. 4.

FIG. 5 is a flowchart of a motor output limiting operation in the second embodiment of the motor drive control device according to the present invention. This flowchart is carried out during the operation of the machine tool, in the upper control device 6, the flowchart is controlled by processing programs in which the upper control device 6 executes, in the control unit 12', the flowchart is controlled by processing programs in which the control unit 12' executes, and in the control unit 14', the flowchart is controlled by programs in which the control unit 14' executes.

First, the control unit 12' monitors the DC link voltage and provides information of the DC link voltage value to the upper control device 6 (step S1'), and the upper control device 6 receives the information of the DC link voltage value from the control unit 12' (step S2') and the procedure proceeds to step 3.

The present invention is not limited to the embodiments described above and there can be various alterations and modifications. For example, as a commercial alternating-current power source, the three-phase alternating-current power source 3 is used, however, it is also possible to use a multiphase alternating-current power source other than the three-phase alternating-current power source as a commercial alternating-current power source. Further, the case where the control unit 12' or the control unit 14' provides information of the DC link voltage value to the upper control device 6 as information about the DC link voltage, is explained, however, it is also possible to provide information of the result of comparison between the DC link voltage value and the threshold value to the upper control device 6 as information about the DC link voltage.

As above, the present invention is explained in relation to the preferred embodiments, however, a person skilled in the art will understand that various alterations and modifications can be made without deviating from the scope of disclosure of claims.

The invention claimed is:

1. A motor drive control device connected to a rectifier unit configured to convert an alternating-current voltage or alternating current into a direct-current voltage or Direct current, for driving and controlling at least one servo motor configured to drive one feed axis to move a table or tool of a machine tool and one spindle motor having one main axis to rotate a table or tool of a machine tool, comprising:

a first inverter unit configured to convert a direct-current voltage or direct current supplied from the rectifier unit into an alternating-current voltage or alternating current and to supply the converted alternating-current voltage or alternating current to the servo motor; a second inverter unit configured to convert a direct-current voltage or direct current supplied from the rectifier unit into an alternating-current voltage or alternating current and to supply the converted Alternating-current voltage or alternating current to the spindle motor;

a first control unit configured to control an alternating-current power of the first inverter unit so as to reduce the feed speed of at least one feed axis of the machine tool if it is predicted that the sum of the output of the servo motor and the output of the spindle motor exceeds the electric power, which can be supplied by the rectifier unit, during a cutting operation of a workpiece by the machine tool and to control the alternating-current power of the first inverter unit so as not to reduce the feed speed if it is predicted that the sum of the output of the servo motor and the output of the spindle motor exceeds the electric power, which can be supplied by the rectifier unit, during an operation other than the cutting operation of a workpiece by the machine tool;

and a second control unit configured to control an alternating-current power of the second inverter unit so as not to limit the torque of the spindle motor if it is predicted that the sum of the output of the servo motor and the output of the spindle motor exceeds the electric power, which can be supplied by the rectifier unit, during the cutting operation of a workpiece by the machine tool and to control the alternating-current power of the second inverter unit so as to limit the torque of the spindle motor if it is predicted that the sum of the output of the servo motor and the output of the spindle motor exceeds the electric power, which can be supplied by the rectifier unit, during an operation other than the cutting operation of a workpiece by the machine tool;

wherein monitoring of a DC link voltage between both ends of a DC link capacitor connected between the rectifier unit and the first inverter unit, by the first control unit, or monitoring of a DC link voltage between both ends of a DC link capacitor connected between the rectifier unit of a DC link capacitor connected between the rectifier unit and the second inverter unit, by the second control unit, is carrier out, wherein the first control unit and the second control unit predict that the sum of the output of the servo motor and the output of the spindle motor exceeds the electric power, which can be supplied by the rectifier unit, if the DC link voltage value between both ends of the DC link capacitor is less than a threshold value.

2. The motor drive control device according to claim 1, wherein the first control unit or the second control unit provides information about the DC link voltage to an upper control device, and the first control unit controls the alternating-current power of the first inverter unit so as to reduce the feed speed of at least one feed axis of the machine tool in response to a feed speed reduction command issued from the upper control device if the upper control device predicts that the sum of the output of the servo motor and the output of the spindle motor exceeds the electric power, which can be supplied by the rectifier unit, during the cutting operation, by determining that the DC link voltage value between both ends of the DC link capacitor is less than a threshold value.

3. The motor drive control device according to claim 1, wherein the first control unit or the second control unit provides information about the DC link voltage to an upper control device, and the second control unit controls the alternating-current power of the second inverter unit so as to limit the torque of the spindle motor in response to a torque limitation command issued from the upper control device if the upper control device predicts that the sum of the output of the servo motor and the output of the spindle motor exceeds the electric power, which can be supplied by the rectifier unit, during the cutting operation, by determining that the DC link voltage value between both ends of the DC link capacitor is less than a threshold value.

* * * * *

UNITED STATES PATENT AND TRADEMARK OFFICE
CERTIFICATE OF CORRECTION

PATENT NO. : 8,698,442 B2
APPLICATION NO. : 13/739199
DATED : April 15, 2014
INVENTOR(S) : Tadashi Okita et al.

It is certified that error appears in the above-identified patent and that said Letters Patent is hereby corrected as shown below:

On the Title Page

Item (72) Inventors: "Tadashi Okita, Yamanishi (JP);" should read --Tadashi Okita, Yamanashi (JP);--.

Signed and Sealed this
Twenty-fourth Day of June, 2014

Michelle K. Lee
*Deputy Director of the United States Patent and Trademark Office*